Jan. 12, 1926.  
H. B. DODGE  
1,569,008  
GEARING  
Filed Nov. 21, 1921
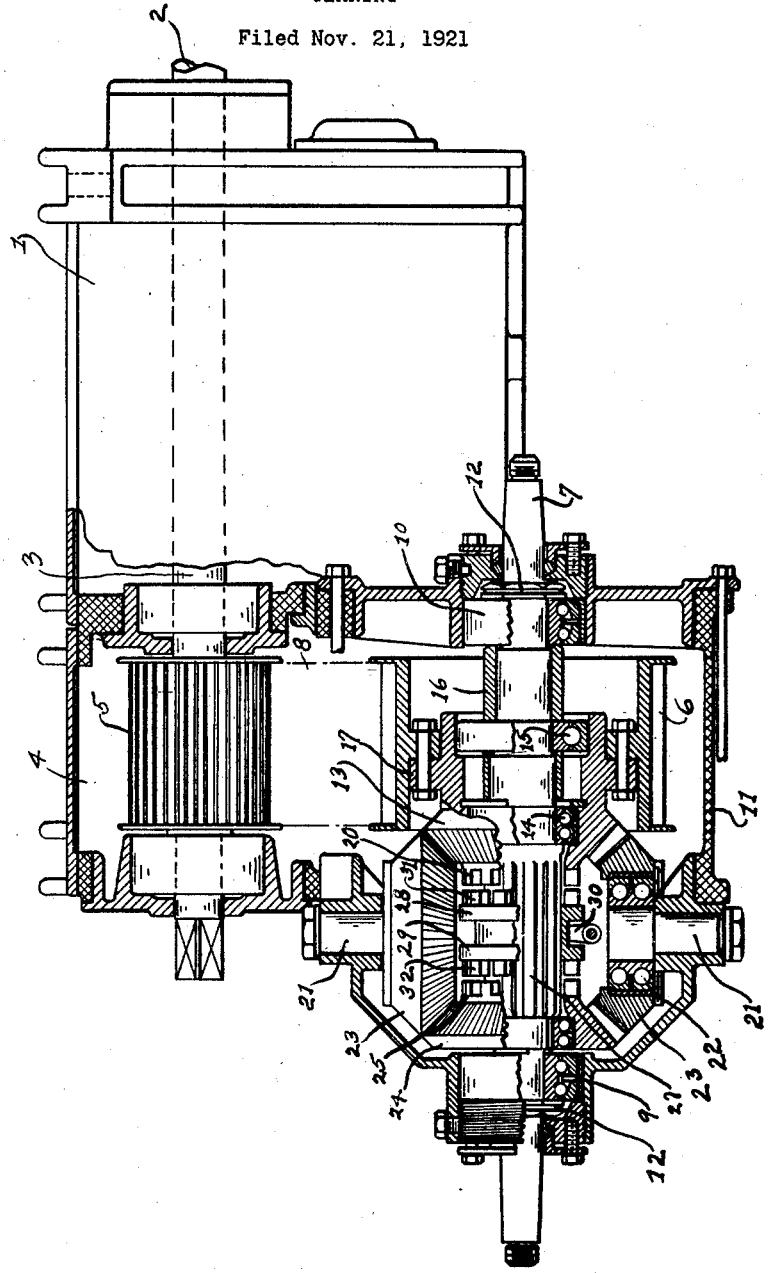
Harry B. Dodge INVENTOR.
BY
Erwin, Wheeler & Woolard
ATTORNEYS.

Patented Jan. 12, 1926.

1,569,008

UNITED STATES PATENT OFFICE.

HARRY B. DODGE, OF CLINTONVILLE, WISCONSIN, ASSIGNOR TO FOUR WHEEL DRIVE AUTO COMPANY, OF CLINTONVILLE, WISCONSIN, A CORPORATION OF WISCONSIN.

GEARING.

Application filed November 21, 1921. Serial No. 516,683.

To all whom it may concern:

Be it known that I, HARRY B. DODGE, a citizen of the United States, residing at Clintonville, county of Waupaca, and State of Wisconsin, have invented new and useful Improvements in Gearing, of which the following is a specification.

This invention relates to improvements in gearing. More particularly, it relates to reverse gearing of a type particularly adapted for association with a change speed gearing assembly, such as is shown and described in the patent to Batenberg #1,219,529, filed March 20, 1917.

The object of this invention is to provide a reversing mechanism peculiarly adapted to be incorporated in the sub-transmission of a vehicle in which power is applied to all four wheels through longitudinally disposed shafts.

It is a further object of this invention to provide a reversing mechanism which will be peculiarly adapted to be interposed in the driving connections of a motor vehicle between the change speed mechanism and the axle assembly, whereby the vehicle may be operated either forwardy or in reverse at any of the speeds provided for by said change speed mechanism.

Other objects of this invention are to provide a reversing mechanism adapted for use in connection with change speed mechanism and driving connections such as are already provided in said type of motor vehicle, and to provide a simple, strong and easily constructed form of reverse mechanism which will nevertheless be capable of fulfilling the objects hereinbefore specified.

The drawing represents a side elevation of the reversing mechanism of this invention as it appears when associated with the casing or housing for a set of change speed gearing, said reversing mechanism and portions of the mechanism within said housing being shown in section.

The change speed mechanism of any ordinary construction may be housed within the casing 1. The drive shaft 2 connected to the engine crank shaft, is journaled in housing 1 at its forward end and the driven shaft 3 extends through the rear wall of the casing into an auxiliary casing 4, wherein it is provided with a sprocket wheel 5 which is adapted to drive a transmission chain. The mechanism thus far described is well known in the art.

Heretofore the chain passing over sprocket wheel 5 has been engaged about a second sprocket wheel 6 fast upon a shaft 7 from the ends of which transmission shafts were led to differential gearing upon the front and rear axles. In the present construction however the sprocket wheel 6 driven by the chain indicated at 8 instead of being rigidly secured to shaft 7 is connected thereto through the reversing mechanism hereinafter to be described.

The shaft 7 is provided with suitable bearings 9 and 10 in the end of sub-transmission casing 11. Suitable packing glands may be used at 12 if desired to prevent the escape of oil or lubricating fluid from the interior of the casing. The bevel gear wheel 13 is provided with suitable bearings at 14 and 15 upon shaft 7, which permit said wheel to rotate freely thereon. The thrust of said wheel is absorbed through sleeves 16 or other suitable devices. Upon its inner face the wheel 13 is provided with a clutch member 20 the function of which will appear hereinafter.

To an annular flange 17 upon the hub of gear wheel 13 is bolted the annulus which comprises the sprocket wheel 6. Said sprocket wheel 6 and bevel gear 13 therefore turns as a unit upon bearings 14 and 15 on shaft 7.

Preferably at right angles to shaft 7 and in the plane of the axis of said shaft are one or more stud shafts 21 provided at their inner ends with suitable bearings 22 upon which the gear wheels 23 are freely rotatable. As clearly appears in the drawing these wheels are in mesh with the bevel gear 13. They also mesh with a wheel 24 which is similar to wheel 13 and is so mounted as to be freely rotatable upon shaft 7. Like wheel 13, the bevel gear 24 is provided upon its inner face with a clutch member 25.

The central portion of shaft 27 is squared or splined as indicated in the drawing whereby the sleeve 28, which is free to slide longitudinally of said shaft, will be caused to rotate therewith. Sleeve 28 has a peripheral groove 29 with which the shifting fork indicated at 30 is engaged. The member 28 is provided upon each of its faces with clutch members 31 and 32, which are adapted to mesh respectively with members 20 and 25.

In the operation of this device the power received from shaft 2 and transmitted through the change speed gearing or by direct drive through the casing 1 to shaft 3 will be communicated through sprocket wheel 5, chain 8 and sprocket wheel 6 or other equivalent drive means to the hub of the bevel gear 13. Bevel gear 13, being connected through the gears 23 with bevel gear 24, will drive said last mentioned gear in a direction opposite to the direction of its own rotation. As long as sleeve 28 is left in the neutral position in which it is illustrated in the drawing, the shaft 7 will not turn and no power will be applied to the wheels of the vehicle. If, however, the fork 30 is oscillated to move sleeve 28 to the right to engage the clutch member 31 carried thereby with clutch member 20 upon bevel gear 13, said sleeve will be caused to rotate with gear 13; and shaft 7, being splined to said sleeve, will rotate therewith. With these clutch members 31 and 20 thus engaged it will be obvious that any change of speed-power ratio effected by the operation of the mechanism within casing 1 can be made without altering the operative driving connections from sprocket wheel 5 through chain 8, sprocket wheel 6 sleeve 28, and shaft 7 to the live axles of the vehicle.

If, on the other hand, it be desired to reverse the direction of the vehicle without altering the gear ratio as controlled by the arrangement of the change speed mechanism at the time, the fork 30 is simply operated to move sleeve 28 to the left and to engage thereby clutch members 25 and 32. Power will now be transmitted from the change speed mechanism and sprocket wheel 5 through chain 8, sprocket wheel 6, bevel gear 13, gears 23, bevel gear 24 and sleeve 28 to the shaft 7 which will be caused to rotate with bevel gear 24 in a direction opposite to that in which bevel gear 13 rotates. Obviously bevel gears 23 and gear 24 run idle at all times save when they are so connected as to turn shaft 7 for the reversal of the direction of the vehicle.

I claim:

1. In a device of the character described, a transmission shaft, reversing mechanism comprising a pair of spaced gears co-axial with said shaft, an intermediate gear radially of said shaft and connecting the pair of gears, a pulley connected with one of said pair of gears, a ballbearing member on said shaft disposed centrally of said pulley, and spacing means on said shaft for positioning said bearing member.

2. In a device of the character described, a reversing transmission including a shaft, a gear rotatably mounted on said shaft and having a hollow hub, a pulley secured to said hub, a ballbearing member disposed between said hub and shaft, and spacing collars on said shaft and each disposed upon opposite sides of said ballbearing member.

HARRY B. DODGE.